June 16, 1959 J. E. FLOOD 2,891,113

AUTOMATIC TELEPHONE EXCHANGE SYSTEMS AND THE LIKE

Filed Jan. 24, 1957 7 Sheets-Sheet 1

AUTOMATIC TELEPHONE EXCHANGE SYSTEMS AND THE LIKE

Filed Jan. 24, 1957

AUTOMATIC TELEPHONE EXCHANGE SYSTEMS AND THE LIKE

Filed Jan. 24, 1957 7 Sheets-Sheet 6

2,891,113

AUTOMATIC TELEPHONE EXCHANGE SYSTEMS AND THE LIKE

John Edward Flood, London, England, assignor, by mesne assignments, to Siemens Edison Swan Limited, a British company Application January 24, 1957, Serial No. 636,068

Claims priority, application Great Britain January 24, 1956

14 Claims. (Cl. 179—18)

Figure 1:
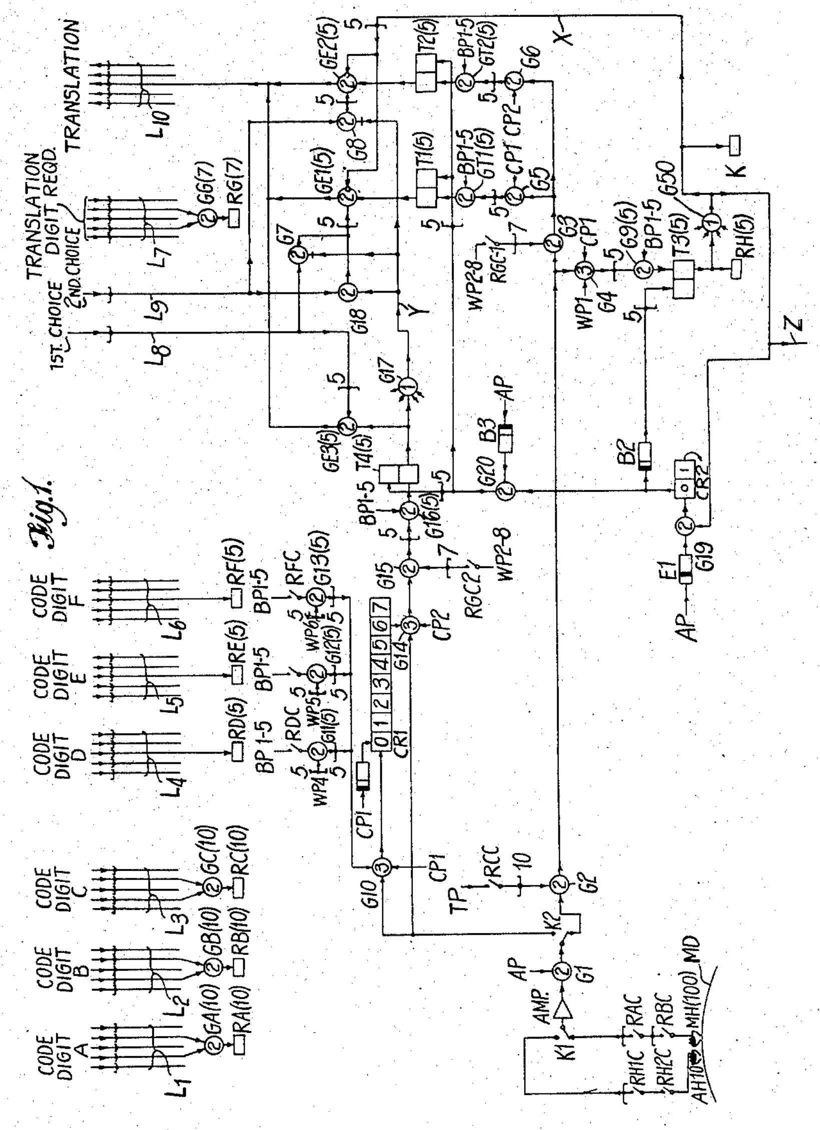

This invention relates to automatic telephone exchange systems and the like, in particular to so-called translators as used in such systems for translating a "code" of digits identifying a called exchange into a further code, not necessarily always different from the first, appropriate to the setting up of a route or channel to that exchange and possibly also to the control of other functions such for instance as metering the call. The exchange identification code is received by a "register" by which it is sent to the translator, whence the translation is passed to a "sender" by which the appropriate route is set up and any other functions controlled. The functions of the register and sender are often combined in a so-called register sender, but this latter term will be used in the following to denote either equipment performing both register and sender functions or simply a combination of register and sender in which each performs its own function. The number required on the called exchange, also identified by a series of digits following those of the exchange identification code, is usually transmitted directly by the register-sender, namely without translation.

As will appear hereinafter, the present invention contemplates using as a translator which may be common to, but separate from, a group of register-senders, a continuously operable information storage device of the kind in which information is stored in digital form in a magnetic or other suitable storage medum capable of assuming a readily detectable condition variable in accordance with such information, storage of the information being effected along one or more continuous tracks on the device by selective variation of said condition in unit areas of the recording medium each corresponding to one digit of information. Information to be stored is "written" on to such a device by means of so-called writing heads of which at least one is provided per track. Likewise the stored information can be "read" from the drum by means of so-called reading heads, again at least one per track, which may be separate from the writing heads or, where it is not required to write and read information simultaneously, may in suitable circumstances be constituted by heads capable of fulfilling both functions.

It is at present expected that the storage device employed will be in the form of a drum, or equivalently of a disc or continuous tape, having at least its operative surface constituted by a magnetic storage medium, storage of digital information being by selective magnetisation of unit areas of the surface. For such a magnetic storage drum or equivalent each reading and/or writing head associated therewith will essentially comprise a small magnetic element defining a magnetic circuit including an air gap and having a small coil linked therewith, the head being in use positioned with the air gap close to the drum surface. For writing, the coil is appropriately energised and the fringing magnetic field induced across the gap correspondingly magnetises the area of the drum surface instantaneously opposite the gap. When reading, the field produced by the area of the magnetised drum surface instantaneously opposite the gap induces a corresponding flux in the magnetic circuit of the head and results in a corresponding output being obtained from the coil.

In my copending application No. 623,669 of 1956, it is proposed to provide for an automatic telephone or like exchange translating equipment comprising a storage device of the kind set forth above at different "addresses" on which translations corresponding to different exchange codes can be stored in digital form, means for receiving from a register-sender a code for which translation is required, and means responsive to such code for selecting the address on the storage device at which the appropriate translation is stored and sending the translation back to the register-sender.

By an address on the storage device is meant that portion of its surface area which includes all the unit areas corresponding to the digits which pertain to a particular translation. In the translating equipment according to said copending application, the digits for each translation may be stored in either serial or parallel form; however, the present invention is concerned only with the serial form of storage, that is, the digits which make up any one translation are stored in successive unit areas along one and the same track and the address of such translation is the sector of the track which embraces these unit areas. With the translations thus stored in serial form the digits of each, when called for, appear sequentially at the output of one and the same reading head.

It is envisaged that the translating equipment described in my said copending application will be most advantageously employed where exchange codes to be translated consist of not more than three decimal digits. There may be circumstances however in which more than three digits may be required to identify a particular exchange. For example, in automatic exchange systems in which both calls between exchanges in different areas and calls between exchanges in the same area are to be capable of being set up by a caller without intervention of an exchange operator, that is, the caller dials all the code and numerical digits appropriate to identifying the called exchange and number irrespective of whether it is a so-called local call or trunk call, the coding scheme employed for identifying the various exchanges according to the areas in which they lie may require an identification code of up to six digits for any particular exchange. Thus the territory over which such a system is in use may be divided up into a number of areas each identified by a code of three digits and including a number of exchanges also identified by three-digit codes, each exchange therefore being fully identified by a six-digit code. For dialling a call to an exchange in the same area only the three-digit exchange code need precede the called subscriber's number and a translator would only require to handle these three digits. Likewise in the case of a call to a different area, only the three digits of the area code would need to be translated to route the call to the switching centre of that area. In the case of a call to an adjacent area, however, there may be a direct route over which the calling and called exchanges could be connected without passing through the switching centres of the two areas concerned; if special dialling procedures are to be avoided the setting up of a call over that route would then require identification of the called exchange in full and a translation for the full identification code of six digits.

As an alternative coding scheme, the territory covered may be divided up into a number of areas each identified by a single digit and including a number of exchanges which, depending on the type of exchange (director, non-director, and so on), may be identified by codes made up of 2, 3 or 4 digits, each exchange thus being fully identified by a code of 3, 4 or 5 digits. In this case, as with the other coding scheme discussed, a call to an exchange which is in another area but to which a direct route exists again requires translation of the full identification code of the called exchange, whereas in other circumstances translation may be required for only some of the digits of the code.

It is an object of the invention to provide translating equipment which on receiving an exchange code from a register-sender can, in effect, decide whether to give a translation corresponding to a number of digits less than the maximum number which the code may contain—as may be required for calls between exchanges in the same area or between exchanges not directly linked in different areas—or whether to look for a possible translation corresponding to a greater number of code digits and pertinent to, say, the setting up of a call over a direct junction extending between the calling exchange and a nearby exchange in a neighbouring switching area.

To this end the present invention provides translating equipment including a storage device of the kind set forth together with means for receiving a code requiring translation, means responsive to a given number of the digits of said code for selecting on a main track of the storage device an address at which translation information relative to said number of digits is serially stored, said information including a distinctive characteristic if the digits in said given number are such as may belong to a code requiring translation for a greater number of digits, means responsive to translation information read from said address with such distinctive characteristic for selecting an auxiliary track at addresses on which translations corresponding to codes requiring translation for such greater number of digits are serially stored, each translation on such auxiliary track being accompanied at its address thereon by a group of stored digits representing certain digits of the corresponding code including those which are additional to said number, means for comparing the stored code digits on such auxiliary track as thus selected with the relevant digits of the code actually received, means responsive to identity being found between the compared digits at any address on said auxiliary track for passing on a translation read from that address, and means effective when no such identity is found or when the information at the selected address on the main track has not a distinctive character as aforesaid, for passing on a translation read from this last-mentioned address.

As with the translator described in my copending application above referred to, the translating equipment of the present invention will conveniently be adapted to function with the translations on the storage device stored in the form of binary digits, namely having two possible values commonly represented by the numerals "0" and "1." This would require, in the case of a magnetic storage device for instance, only two states of magnetisation in which, respectively, the magnetic material is saturated in the one direction and the other, corresponding to the 0 and 1 values of each digit.

It is contemplated that the exchange identification codes may be composed of decimal digits, as is common, and that it would be desirable for the translations to be made available in decimal digit form also, to which end the binary digits of each translation may be effectively grouped so that each group represents a decimal digit. Storage of the decimal digits in this way would then preferably be in accordance with the so-called two-out-of-five code by which each decimal digit is represented by five binary digits and ten possible values of the decimal digit are represented by different pairs of the binary digits having the value 1 or 0, the remaining three binary digits having the alternate value (that is 0 or 1) in each case. This two-out-of-five code may also be used by a register-sender for sending the decimal digit exchange code to the translator.

Before describing particular embodiments of the invention it may be helpful to indicate in general terms the manner in which the translating equipment of the present invention functions and the considerations involved in providing various subsidiary features incorporated in the embodiments to be described.

Assuming that the exchange identification codes are composed of decimal digits, it is contemplated that for either of the exchange coding schemes discussed above the first three digits of the identification code of an exchange being called may on receipt by the translator select a particular address on, say, one of a hundred main tracks on the storage device each effectively divided into ten sectors, or addresses, in which respective translations are stored in serial form. To this end the first two digits may select one of the hundred main tracks and the third digit select the required sectoral address on the selected track.

If the received code is one which may require translation of more than three digits—for example if the first three digits identify a neighbouring area to that in which the calling exchange is located, with the consequent possibility of there being a local junction between the calling and called exchanges—the translation stored at the main track address selected by the first three digits is arranged to have some distinctive character such as a particular value for one or more of its digits. The presence of such a distinctive character in the translation at a selected main track address instructs the equipment to look in an auxiliary track for possible translation pertinent to 4, 5 or 6 digits of the received codes as the case may be, depending on the coding scheme employed. Thus, assuming the translations are constituted by decimal digits stored in two-out-of-five binary form as previously mentioned, the first digit of the translation at the selected address may be given, in the circumstances being considered, a particular value indicating on which one of, say, ten auxiliary tracks another translation should be sought; the equipment is accordingly arranged to respond to this value of the first digit to select the appropriate auxiliary track.

If, on the other hand, the first three digits of the received code are not such as may possibly require a translation for a greater number of its digits, then the translation at the selected main track address would not include instructions to look on an auxiliary track: for example the space allocated at the selected main track address to the first digit of the translation may in these circumstances be occupied by binary digits all having the same value, preferably "0." The translation at the selected address would then be sent to the register-sender without looking for another translation in an auxiliary track, it being appreciated that a translation digit which contains, or could contain, an instruction so to look but serves no other purpose need not be and usually would not be sent to the register-sender.

The auxiliary tracks are effectively divided, as are the main tracks, into a number of sectoral addresses containing in serial form respective translations each pertaining to an exchange code requiring translation for more than its first three digits owing to the existence of a local junction to the exchange which it identifies. At each of these auxiliary track addresses is also stored, in a portion of the address sector before the portion containing the translation, a group of digits representing certain digits of the code to which the translation at that address pertains, the code digits thus represented including at least those following the first three. Thus for the first coding scheme discussed above the group of code digits stored at an auxiliary track address may represent the last three digits of a six-digit code to which the translation is pertinent, while for the other coding scheme the group of code digits may represent all but the first digit of the pertinent four or five digit code. Instruction as to whether a translation is required for four digits or for five digits of a received code in the latter case may also be included in the translation stored at the main track address which the first three digits of a received code selects.

Having been "instructed" to look for a possible translation for a four-, five- or six-digit code in a particular auxiliary track, all of the translations on which will preferably pertain to codes for exchanges in one and the same area adjacent that in which the calling exchange is located, the equipment compares the group of digits stored at the various addresses with the relevant digits of the code actually received from the register-sender. If identity is found between the code digits stored at any address and the relevant code digits as received, the translation at that address is sent to the register-sender, which consequently sets up the call over the local junction to which that translation pertains. If, however, no such identity is found—indicating that there is no translation for the received code other than that at the main track address selected by its first three digits, that is, there is no local junction to the called exchange—the equipment simply sends to the register-sender the translation obtained at the selected main track address.

It is contemplated that translations of seven decimal digits each may be required by the register-sender and that for a translation on a main track these seven digits may be stored along with an additional "instruction" digit indicating which, if any, auxiliary track may contain a translation for all digits of the code concerned. It is also contemplated that the storage device employed may have accommodation for up to about one thousand digits per track (a magnetic storage drum of this capacity being commercially available) and it will be apparent that, with the translation digits stored in two-out-of-five binary code as mentioned above, there would then be room for two complete translations at each of the ten sectoral addresses into which the main tracks have been taken as being effectively divided. Accordingly alternative translations, corresponding, say, to alternative routes, other than a local junction, between the calling and called exchanges, may be provided for the first three digits of any exchange code, the equipment including in such circumstances means for selecting one or other of the alternative translations depending, for instance, on whether or not the route corresponding to the first alternative is busy. Alternative translations could likewise be stored at each auxiliary track address, but preferably only one translation would be stored there and means provided for selecting as an alternative to that translation one of the translations stored at the main track address initially selected by the first three code digits.

Generally speaking, a complete cycle of operation of the storage device (that is, in the case of a storage drum or disc, a complete revolution) will be required for reading off the translation(s) at a selected main track address, and a further cycle will be required, if and when an auxiliary track address has been selected, for reading off the translation at the latter. Time is also required for receiving a code to be translated from a register-sender, for selecting the address required on a main track, for selecting, if necessary, an address on an auxiliary track, and for sending back the appropriate translation to the register-sender. It will therefore usually be necessary to allow one or more cycles of operation between successive cycles on which translations are being read off and this may be allowed for by providing a gating arrangement which in effect permits translations to be taken from the storage device only on, say, alternate cycles of operation.

Figure 2A:
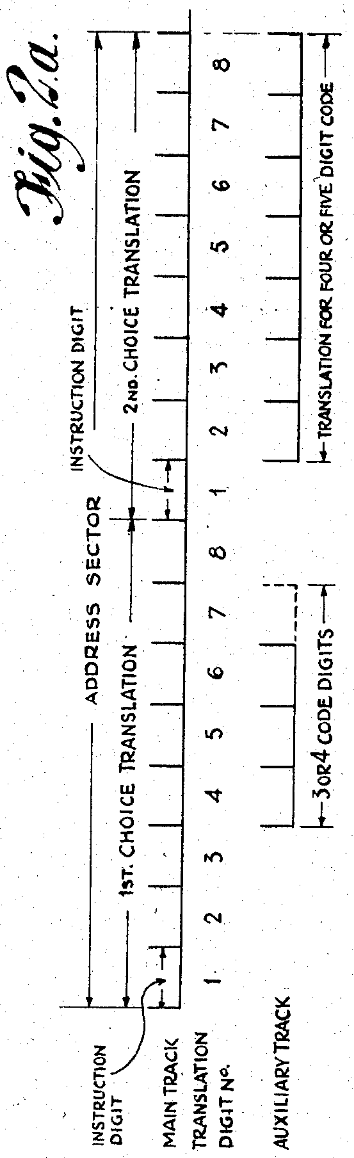
Figure 2:
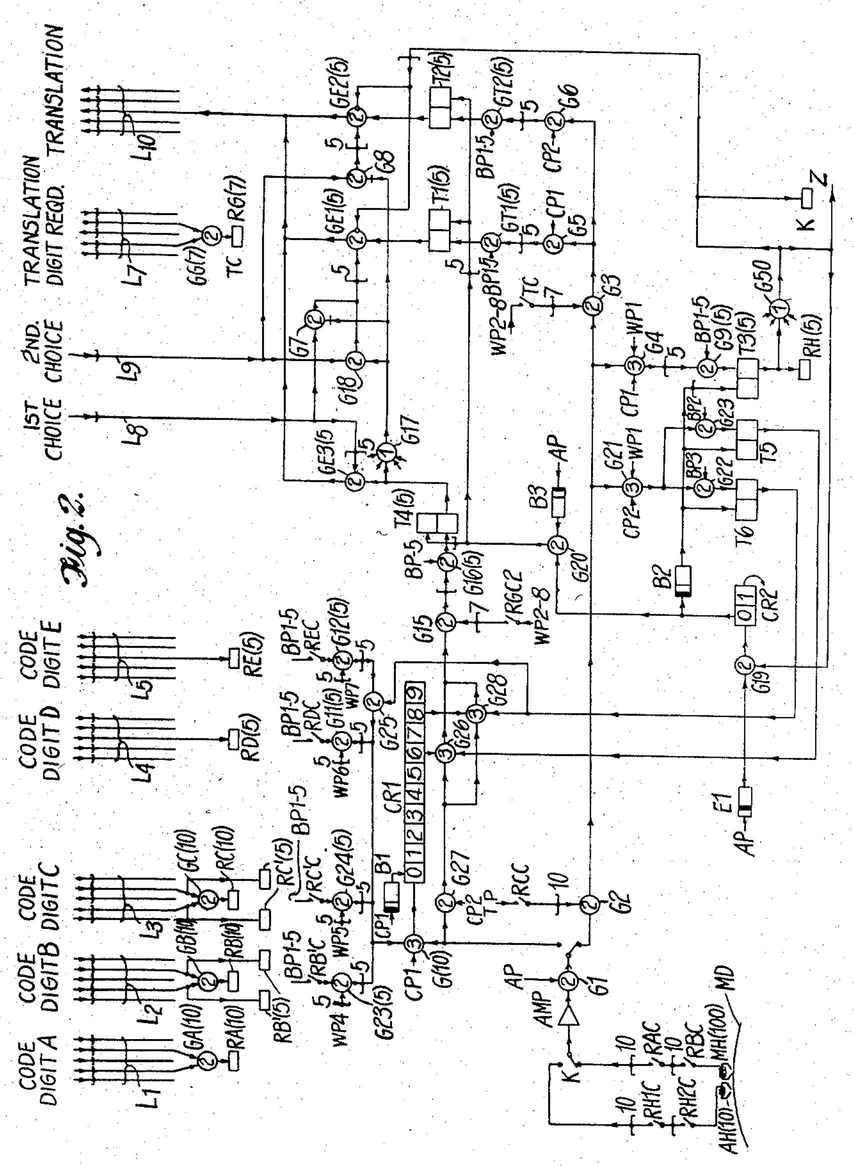
Figure 3:
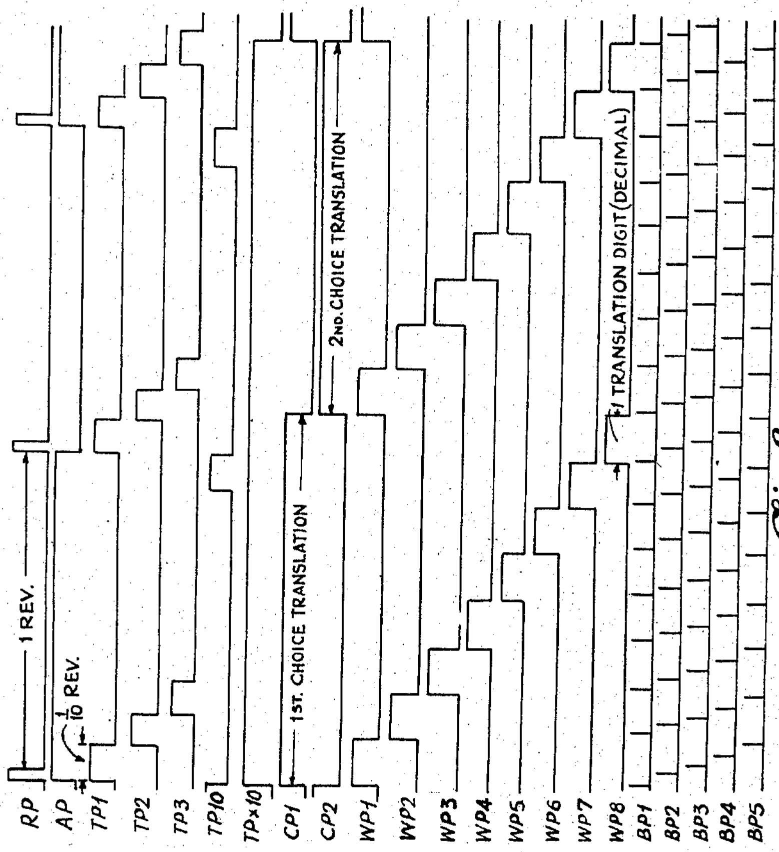
Figure 8:
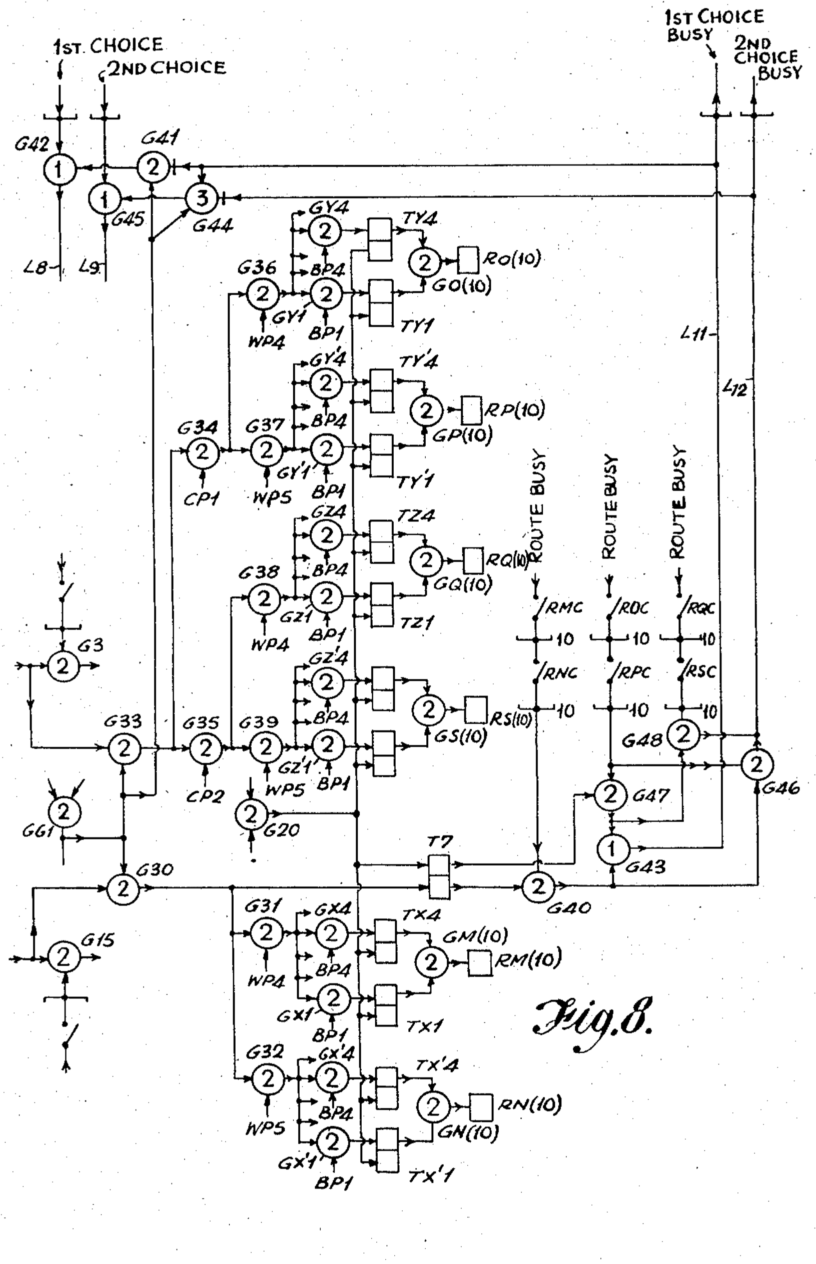
Figure 9:
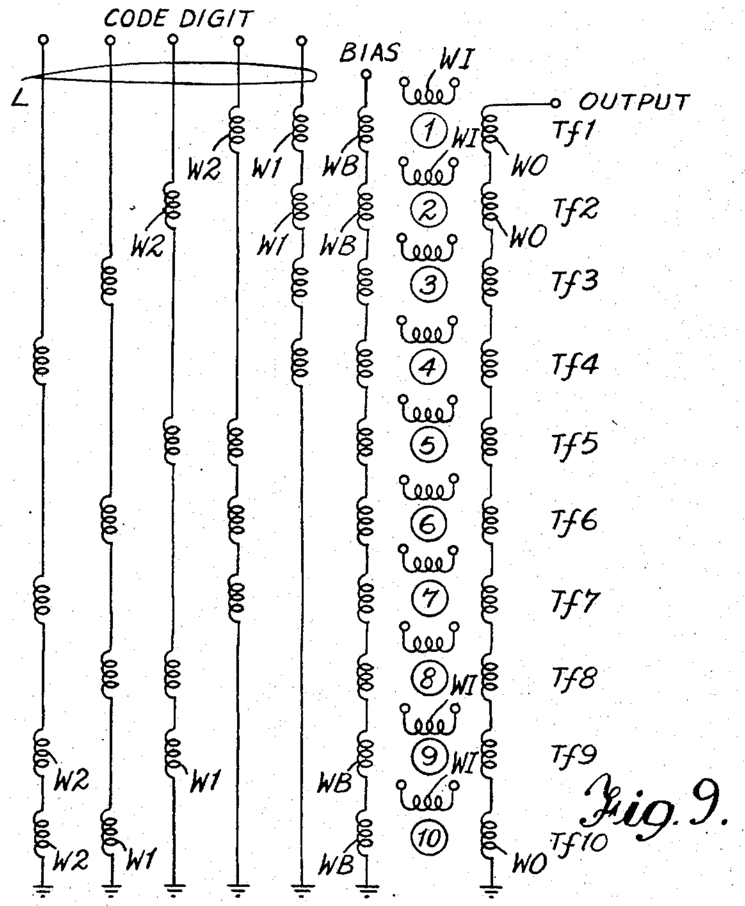

In order that the invention may be more fully understood reference will now be made to the accompanying drawings in which:

Figs. 1 and 2 are functional diagrams of magnetic drum translators in accordance with the invention, the translator of Fig. 1 being intended for use in connection with the first of the two exchange coding schemes discussed above, and that of Fig. 2 in connection with the second of these schemes;

Figs. *1a* and *2a* illustrate the manner in which translations are stored on the magnetic drum in the translators of Figs. 1 and 2 respectively;

Fig. 3 illustrates the relative timing of various pulses required for the operation of the translators of Figs. 1 and 2;

Figs. *4a*–*4c* and 5–7 are diagrams of suitable circuits for various components represented only by functional symbols in Figs. 1 and 2;

Fig. 8 is a functional diagram of additional apparatus that may be used with Figs. 1 and 2; and Fig. 9 illustrates a modification that may be used for reading head selection in Figs. 1 and 2.

In Figs. 1 and 2 various functional symbols are employed to represent gating circuits, trigger circuits and so on. Thus a gate is represented by a circle with two or more input leads—indicated by an arrow head directed towards the circle—and an output lead, the numeral inside the circle indicating that a signal will appear on the output lead when and only when that number of input leads, excluding any such leads terminated with a small circle, are appropriately stimulated. Normally the presence of a signal of given polarity on an input lead constitutes stimulation thereof for this purpose, but where an input lead has a short transverse line applied to it between the arrow head and the main circle, stimulation is constituted by the absence, rather than presence, of such signal on the lead. Where an input lead terminates in a small circle as mentioned, the presence of a signal of given polarity on that lead prevents (inhibits) the appearance of a signal on the output lead whether or not other input leads are appropriately stimulated. For instance considering the gate G1 in Fig. 1, in which a pulse AP lasting for a revolution of the storage drum is applied to one input lead of the gate on alternate revolutions and a series of output pulses of given polarity (namely corresponding to "marked" binary digits stored on the drum) is applied to the other input lead, a corresponding series of pulses will appear on the output lead from the gate G1 only at such times as the pulse AP is applied, the gate being said to be opened by the pulse AP to permit the passage of the output pulses. In the same way, the gate G4 provides an output signal only when its three input leads simultaneously carry a signal of appropriate polarity, whereas for the gate G10 to be opened a signal need be present on only one input lead. On the other hand the gates G7 will be opened only in the absence of a signal on the lead Y and then only if a signal is present on its other input lead, while each GE1 gate will be prevented from opening by a signal on the lead X, even if signals are present on its other two input leads.

A two-position trigger circuit is represented by a double rectangle such as T3(5) an input lead to a rectangle having also an output lead extending therefrom indicates that in response to a signal on that input lead the circuit will be triggered to one stable position or state and produce an output signal, while an input lead to the other rectangle indicates that the circuit will be reset to its initial condition by a signal applied to this last lead. Likewise a counter circuit, which may be considered as a multi-stage trigger circuit, is represented by a row of numbered squares representing respective stable states from one of which to the next the circuit is stepped by the application of successive pulses to the input lead shown entering one end of the symbol, an output being obtained from the counter when it reaches a state, or count, represented by a square from which an output lead extends. Thus the counter CR1 in Fig. 1 gives an output on reaching a count of six. The counter is reset on application of a signal to an input lead entering the top or bottom of the first (O) square, except in the case of a cyclic counter, such as CR2, which returns to its initial state on receipt of the next input pulse after reaching its maximum count, this being indicated by a semicircular lead attached to the end of the counter symbol opposite the input end.

A two-part rectangle with a thick bar at one end represents a timing element which provides an output pulse coincident with the beginning of an input pulse, while a similar rectangle but with the thick bar spaced from the end represents a timing element producing an output pulse coincident with the end of an input pulse. Examples of these timing elements are, respectively, the components B3 and E1 in Fig. 1.

In order to make the operation of the translators of Figs. 1 and 2 more immediately apparent, various groups of components performing identical functions and selectively brought into effective operation have been represented only by a typical component of the group, the reference symbol for such component being followed by a bracketed numeral indicating the number of components in the group concerned: thus the gate GA(10) is one of ten such gates which are connected to the group of leads for the "A" code digit and control the operation of respective relays typically represented by the rectangle RA(10). Moreover where a group of similar components are connected to a common lead, only a typical member of the group is shown and a square bracket is applied to the common lead with a numeral appended to indicate the number of components in the group.

It is assumed that the magnetic storage drum MD in each figure has a hundred main tracks associated with respective reading heads typically represented by the head MH(100), and ten auxiliary tracks associated with respective reading heads typically represented by the head AH(10).

The translator of Fig. 1 is adapted for use in connection with an exchange coding scheme in which the territory covered is divided into a number of areas each of which is identified by three decimal code digits and includes a number of exchanges which are also each identified by three decimal code digits, so that each exchange is fully identified by a six digit code.

Referring to Fig. 1 a six-digit exchange identification code for which a translation is required is received by the translator from a register-sender (not shown) over six groups of leads L1 to L6 pertaining respectively to the six decimal digits A to F of the code. In each group of leads the value of the pertinent decimal digit of the received code is indicated in two-out-of-five code, the register-sender to this end applying a "mark," that is a potential of given sign, to a particular combination of two leads in the group, the other leads being unmarked.

Each combination of two leads in the group L1 is connected to a gating circuit, typified by GA(10), which will be opened to produce an output signal when the two leads of the combination are marked: in this way the ten GA gates effectively convert the two-out-of-five marking on the leads of group L1 into a one-out-of-ten marking on the respective output leads of these gates. Likewise each combination of two leads in the groups L2 and L3 is connected to a gating circuit typified by GB(10) or GC(10). The GA, GB and GC gates control respective relays typified by RA(10), RB(10) and RC(10) which are energized when the corresponding gates are open. Thus in response to the first three digits of any particular exchange code sent to the translator one of the RA relays, one of the RB relays and one of the RC relays will be energised.

The energised RA relay closes its contacts RAC to select from the hundred main track reading heads typified by MH(100) a particular group of ten heads from which the energised RB relay, by closing its contacts RBC, selects the MH head associated with the particular main track at an address on which a translation for the first three digits of the received code is stored in serial form.

As the magnetic drum MD rotates the information stored on the main track thus selected is read off and applied to one input lead of a gate G1 by way of back contacts K1 on a relay K and a reading amplifier Amp. On alternate revolutions of the drum the other input lead of the gate G1 has applied to it a pulse AP (see also Fig. 3) which has a duration corresponding to one revolution and may be derived from a revolution marking pulse RP by means of a binary counting stage (not shown). Selection of a main track having been effected by energisation of the appropriate RA and RB relays during a revolution of the drum when the pulse AP is not being applied to the gate G1, the pulse AP opens the gate on the next revolution and the information read from the selected main track passes by way of back contacts K2 on the relay K to a gate G2.

The gate G2 also has applied to it, through the contacts RCC of the energised RC relay, one of ten pulse trains TP1 to TP10 (Fig. 3) the pulses in each of which have a repetition rate of one per revolution of the drum and a duration corresponding to a tenth of a revolution. These pulse trains, which have a relative phasing such that their pulses occur in turn, are so synchronised with the rotation of the drum that on each revolution their respective pulses coincide with the passage past the MH reading heads of ten address sectors into which each main track is effectively divided. Accordingly the TP pulse selectively applied by the energised RC relay to the gate G2 opens this gate to pass to gates G3 and G4 all the information stored in the corresponding address sector of the selected main track.

Figure 1A:
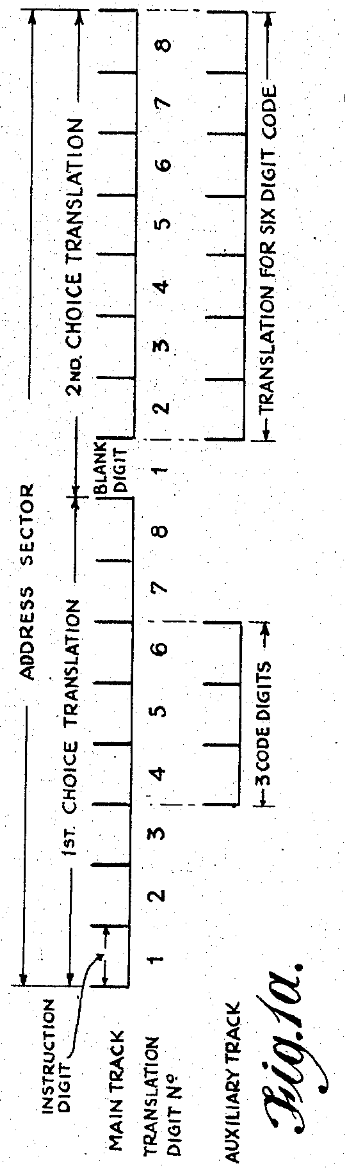

At each address sector on the main tracks are stored two alternative translations (see Fig. 1*a*) for the three code digits selecting that address, each of these translations occupying half of the address sector and consisting of eight digits of which the first is reserved for use as an "instruction" digit, being left blank if not so used or if no instruction is required, while the remaining seven constitute the translation proper which, if called for, will be sent to the register-sender. It will be appreciated that the translations stored may have fewer digits than this, or more digits if the capacity of the drum is sufficient. Each translation digit is itself represented by a group of five binary digits. If the three code digits selecting an address on a main track represent an area for which a translation for six code digits may be required (owing to the existence of local junctions between the calling exchange and some of the exchanges in that area) the "instruction" digit of the first translation stored at the selected address indicates in two-out-of-five code (namely by having two of its five constituent binary digits "marked" with the value "1") on which of the ten auxiliary tracks such translation may be found. The "instruction" digit of the other translation at the address is not used for the translator of Fig. 1 and is therefore left blank, as is the first instruction digit of no translation pertinent to six digits of the received code is possible. The values of the remaining translation digits are represented by their constituent binary digits in two-out-of-five code, it being assumed that the translations provided by the translator are to be in decimal digit form.

The gates G3 and G4 in Fig. 1 therefore receive from the gate G2 all the binary digits stored in the selected main track address, that is, the binary digits representing both of the alternative translations stored at that address for the first three digits of the code received.

Register-senders commonly operate by transmitting successive pulse trains separated by significant pauses, and it is convenient for a register-sender to take a translation one decimal digit at a time during successive inter-train pauses. To this end a second group of five leads L7 is marked by the register-sender in accordance with a two-out-of-five code to indicate which of the seven decimal digits of a translation other than the "instruction" digit is required at any given time. Each of the seven combinations of two leads from the group L7 which may be marked in this way is connected to a gating circuit typified by GG(7). In dependence then on which two leads of the group L7 are marked one of the GG gates will be opened to cause energisation of a corresponding relay typified by RG(7).

Eight pulse trains WP1 to WP8 are provided (see Fig. 3) which are so phased and synchronised that during passage of each main track address sector past the associated MH reading head the pulses from these trains coincide respectively with the passage of the translation digits stored in that sector; for instance successive WP1 pulses coincide with the passage past the reading head of the first digits of successive translations.

The energised RG relay closes its contacts RGC1 to apply one of the pulse trains WP2 to WP8 to the gate G3, which accordingly passes to the gates G5 and G6 the binary digits constituting the requested translation digit (as determined by the marking of the leads L7) of both translations at the selected main track address. To these gates G5 and G6 are also applied respective pulses CP1 and CP2 coinciding with the passage past the pertinent MH reading head of respective halves of each address sector on the selected main track.

The binary digits constituting the requested digit of the translation accommodated in the first half of the selected address sector, two of which binary digits will be marked, are therefore passed by the gate G5 (opened by the pulse CP1) to each of five gates such as GT1(5). These gates are opened cyclically in turn, at times corresponding to the occurrence of successive binary digits, by the application thereto of respective trains of pulses BP1 to BP5. At two of the GT1 gates the applied BP pulses and the marked binary digits will therefore coincide, resulting in these two gates producing respective output pulses to operate (trigger) two of five trigger circuits, typified by T1(5), the outputs from which pass to respective gates typified by GE1(5). Similarly the binary digits constituting the requested digit of the translation in the second half of the selected sector are passed by the gate G6 and two of the five gates typified by GT2(5) to operate two of five trigger circuits, such as T2(5), the outputs of which are applied to respective gates typified by GE2(5). The output leads of the GE1 gates are connected to respective leads of a group L10 leading back to the register-sender, and likewise the output leads of the GE2 gates are respectively connected to these leads.

To indicate which of the alternative translations is required, the register-sender marks one or other of two further leads L8 and L9. If the instruction digit of the first translation contains no instruction to look in an auxiliary track, no signal will be on the leads X and Y at this time. Accordingly if the lead L8 is marked a gate G7 will be opened to produce an output signal which in turn will open the two GE1 gates connected to the operated T1 trigger circuits. The output signals from these two GE1 gates then mark a corresponding pair of the leads L10, thereby providing in two-out-of-five code on the latter the requested digit of the first translation stored at the selected main track address. If, on the other hand, the lead L9 is marked, a gate G8 and the two GE2 gates connected to the operated T2 trigger circuits will be opened, resulting in a corresponding pair of leads in the group L10 being marked to provide in two-out-of-five code as before the required digit of the second translation at the main track address. It will be appreciated that as no provision is made for the WP1 pulse to be applied to the gate G3 the first, or instruction, digit of a translation will not be sent back to the register-sender.

Turning now to the operation of the translator when the instruction digit of the first translation at the selected main track address does contain an instruction to look in an auxiliary track, it will be recalled that all the binary digits at the selected address are applied to the gate G4. To this latter gate are also applied the WP1 pulse train and the CP1 pulses, with the result that this gate will pass the binary digits constituting the instruction digit of the first translation stored at the address concerned. These binary digits, two of which are marked to indicate in two-out-of-five code which of the ten auxiliary tracks has to be examined, are passed to each of five gates, typified by G9(5), which like the GT1 and GT2 gates are opened cyclically in turn, at times corresponding to the occurrence of successive binary digits, by the respective application thereto of the pulse trains BP1 to BP5. Of these G9 gates the two to which the BP pulses coinciding with the marked binary digits are applied will therefore produce output pulses to operate respective trigger circuits typified by T3(5). The operated T3 trigger circuits apply an inhibition signal via the gate G50 and the lead X to the GE1 and GE2 gates, thus preventing the output signals from either the operated T1 triggers or the operated T2 triggers from being passed to the leads L10 and thence to the register-sender. At the same time the relay K is operated to change its contacts K1 and K2 from their back position to their front position.

The T3 trigger circuits control the operation of respective relays, typified by RH(5), two of which will accordingly be energised to select by their respective contacts, such as RH1C and RH2C, one of the ten AH reading heads associated with the auxiliary tracks. These auxiliary tracks are effectively divided into sectors corresponding in position to those in the main tracks. In the first halves of the auxiliary track sectors, at positions in each corresponding, say, to the fourth, fifth and sixth digits of the first translation in a main track sector (see Fig. 1*a*), are stored in two-out-of-five binary form the second three digits of respective six-digit codes which require translation for all six digits. In the second half of each auxiliary track sector are stored, again in two-out-of-five binary form, seven decimal digits constituting the translation for the six-digit code whose second three digits are stored in the first half of the sector. As no "instruction" digit is required in this translation the first digit space in the second half of each auxiliary track sector is left blank, the translation digits being stored in the following spaces.

The selection of an auxiliary track is effected during the revolution of the drum following that during which the gate G1 was opened by the AP pulse to pass the binary digits read from the selected main track. On the next revolution, the AP pulse again opens the gate G1 and the binary digits read from the selected auxiliary track pass in the form of pulses, by way of the front contacts K1, the reading amplifier Amp, the gate G1 and the front contacts K2, to a gate G10. Meanwhile the gate G10 is also receiving pulses corresponding to the last three digits D, E and F of the received code. These latter pulses are obtained from three groups of five gates, typified by the gates G11(5), G12(5) and G13(5), as follows:

The leads in each of the groups L4, L5 and L6 are connected to respective relays typified by RD(5) for group L4, RE(5) for group L5 and RF(5) for group L6. The markings on two of the leads L4, representing in two-out-of-five code the fourth digit D of the received code, will therefore energise two of the RD relays; likewise two of the RE relays and two of the RF relays will be energised in accordance with the E and F digits of the received code. The RD relays by their contacts such as RDC, control the respective application of the pulse trains BP1 to BP5 to the G11 gates, to which are also applied in common the WP4 pulses. Similarly the RE relays by their contacts REC and the RF relays by their contacts RFC control the respective application of the pulse trains BP1 to BP5 to the G12 gates on the one hand and the G13 gates on the other hand, the WP5 and WP6 pulses being applied to the G12 gates and G13 gates respectively. Thus during each WP4 pulse the two G11 gates to which the energised RD relays have applied BP pulse trains will pass to the gate G10 respective BP pulses which together represent the D digit of the received code, and in a similar manner, during the WP5 and WP6 pulses, two of the G12 gates and two of the G13 gates will pass to the gate G10 BP pulses representing the E and F digits of the received code.

If the selected auxiliary track contains a translation for all six digits of the received code then the pulses applied to the gate G10 from the G11 to G13 gates will coincide with those which correspond to the marked binary digits read off by the reading amplifier Amp as the three code digits stored in the auxiliary track sector including that translation are read off, this taking place during the passage past the associated AH reading head of the first half of the sector concerned, that is, during a CP1 pulse. The gate G10, to which the CP1 pulses are also applied, accordingly produces six output pulses during this time, since each of the three code digits is represented by two input pulses to this gate. These output pulses are applied to a counter CR1 to step it to its sixth position, a position which it will not otherwise reach since a pulse obtained from a timing element B1 ensures that the counter is reset to its initial (zero) position at the beginning of each CP1 pulse.

On reaching its sixth position in this way the counter CR1 produces an output signal which, in conjunction with a CP2 pulse, opens a gate G14 to pass to a further gate G15 the subsequent binary digits read by the selected AH reading head, that is, the digits constituting the translation digits of the required auxiliary track translation.

The WP pulse corresponding to the translation digit requested is applied through contacts RGC2 of the energised RG relay to the gate G15, which accordingly passes to each of five gates typified by G16(5) the binary digits constituting the appropriate digit of the required translation. The pulse trains BP1 to BP5 are also respectively applied to the G16 gates, two of which (namely those to which the BP pulses coinciding with the marked binary digits from the gate G15 are applied) will therefore produce output pulses to operate respective trigger circuits typified by T4(5). The operated T4 trigger circuits apply a signal to a gate G17 which in turn applies a signal to lead Y thereby preventing the gates G7 and G8 from opening.

The operated T4 trigger circuits also respectively stimulate two of five gates typified by GE3(5) the output leads of which are connected to respective leads of the group L10.

If the register-sender is requesting a first choice translation, that is, if the lead L8 is marked, these two GE3 gates will then be opened and the two leads to which they are connected in the group L10 correspondingly marked thereby to pass to the register-sender in two-out-of-five code, the requested digit of the translation found on the auxiliary track. If, however, the lead L9 is marked to request a second choice translation, for instance if the route corresponding to the first choice is busy, a gate G18 will be opened to stimulate the GE1 gates. The two T1 trigger circuits which were initially operated in accordance with the requested translation digit of the first translation at the selected main track address are still in their operated conditions at this time. Moreover, as will appear, the T3 trigger circuits will be reset at the end of the drum revolution, thereby removing the inhibition on the GE1 and GE2 gates. Accordingly the two GE1 gates which are connected to the operated T1 trigger circuits will then open and pass to the register-sender, by appropriate marking of the leads L10, the translation digit stored by these trigger circuits; in other words the first translation at the selected main track address is taken as an alternative to the auxiliary track translation.

It should be observed here that provision will have to be made to ensure that once the register-sender has received the first digit of a translation and until it has received the complete translation, the marking on whichever of the "choice" leads L8 and L9 was originally marked will not be changed even if a previously busy route to which a rejected translation pertains should become free during this time; this can readily be done in any convenient manner.

The resetting of the T3 trigger circuits is brought about by the action of a cyclic binary counter CR2. During the revolution on which information is being read from a main track (pulse AP applied), this counter remains in its normal ("O") condition and remains there unless a T3 trigger circuit is operated, at which time a stimulus will be applied to a gate G19 from the gate G50 so that at the end of the AP pulse, when a timing element E1 produces an output pulse, the gate G19 will be opened to step the counter CR2. At the end of the next revolution but one, by which time two of the T4 triggers may have been operated, the gate G19 is again opened to step counter CR2 back to its normal condition, resulting in a pulse being delivered to the timing element B2 which in turn sends a pulse to reset the T3 triggers. The pulse from the counter CR2 is also applied to a gate G20 and at the beginning of the next revolution but one again, that is, when the AP pulse is again applied and the T1, T2 or T4 trigger circuits will have sent out their stored information, the timing element B3 applies a pulse to the gate G20 to open it and reset the remaining trigger circuits.

Since with the translating equipment just described only one auxiliary track can be allocated to any particular area as identified by the first three digits of a received code, translations pertinent to local junctions can only be provided for up to ten exchanges in such area. This number could be increased, however, by including between the reading amplifier Amp and the AH reading heads associated with the auxiliary tracks, further relay contacts operated by the RD relays to enable the fourth digit of the received code to select any one of up to ten auxiliary tracks provided in respect of the area identified by the first three digits.

The equipment illustrated in Fig. 2 is intended for the coding scheme wherein each area is identified by a single decimal digit and each exchange in an area by 2, 3 or 4 decimal digits, that is a full exchange code may consist of either 3, 4 or 5 digits. The equipment is generally similar to that of Fig. 1 with the addition of certain components which, when an auxiliary track has been selected in response to an instruction to that effect contained in a main track translation, responds to a further instruction from the main track to control the subsequent operation of the equipment (namely the comparison of stored code digits in the auxiliary track with received code digits) according as the translation required is that for a 4-digit code or a 5-digit code. To this end the information stored in a main track (see Fig. 2*a*) is similar to that required for the purposes of Fig. 1, except that where the first digit of the first translation in a main track sector includes an instruction to look for a translation in a certain auxiliary track, the first digit of the second translation in the sector (left blank for Fig. 1) now includes an instruction as to whether the translation sought is one for a 4- or for a 5-digit code. Moreover each auxiliary track address sector includes, in addition to a translation, a group of either three or four digits corresponding to all but the first (area) digit of the 4- or 5-digit code to which that translation pertains, these stored digits being compared with the corresponding digits of the received code, as in the equipment of Fig. 1, and the translation contained in the sector being sent to the register-sender if identity is found.

Referring to Fig. 2 in which elements having counterparts in Fig. 1 have been given the same designations as before, the operation of the equipment is the same as regards the selection of a main track address by the first three digits A, B and C of the received code, and also as regards both the operation of the T1 and T2 triggers in accordance with the requested digit of the alternative translations at that address and the selection of an auxiliary track by the T3 trigger circuits in conformity with the instruction digit of the first of these alternative translations.

Of the five binary digits constituting the instruction digit of the second translation at a main track address the second alone is marked if a translation for four code digits is to be sought and the third alone if a translation for five code digits is to be looked for. A gate G21 to which the CP2 and WP1 pulses are applied singles out this last-mentioned instruction digit from the information passed by the gate G2 and passes it to two gates G22 and G23 to which the pulse trains BP1 and BP2 are respectively applied. Of these gates G22 and G23 the one at which the applied BP pulse coincides with the marked binary digit of the instruction digit in question will produce an output pulse and operate one or other of two trigger circuits T5 or T6.

In addition to the GB and GC gates which convert to one-out-of-ten markings the two-out-of-five markings indicating the second and third digits of a received code on the leads L2 and L3, these leads have respective relays typified by RB'(5) and RC'(5) connected to them correspondingly with the connection of the RD and RE relays to the leads L4 and L5 on which the fourth and, when applicable, the fifth code digit are received. The RB', RC', RD and RE relays control, by their contacts such as RB'C, RC'C, RDC and REC, the application of the pulse trains BP1 to BP5 to the respective gates in each of four groups typified by G23(5), G24(5), G11(5) and G12(5).

If, therefore, the translation sought in the selected auxiliary track is one for a 4-digit code, in which event the trigger circuit T5 will have been operated and a gate G25 controlled by the trigger circuit T6 will remain closed, the gate G10 will be fed, in a similar manner to that described for Fig. 1, with a series of pulses corresponding to the B, C and D digits of the received code. If these pulses coincide with the code digits read from an address sector on the auxiliary track, the counter CR1 will be stepped six times and on reaching its sixth position will produce an output signal which, in conjunction with a stimulus applied from the trigger T5, opens a gate G26 so as to pass to the gate G15 the binary digits received from a gate G27 during a CP2 pulse, these digits thus constituting the translation contained in the auxiliary track address sector at which the coincidence of code digits was found. If, however, the translation sought is one for a 5-digit code, the trigger circuit T6 will have operated to open the gate G25 and stimulate a gate G28. The gate G10 will then be fed with pulses corresponding to the B, C, D and E digits of the received code and coincidence of these pulses with those read from an address sector on the auxiliary track (such address sector in this instance having four code digits stored therein of two binary digits each) will step the counter CR2 eight times. On reaching its eighth position the counter CR2 stimulates the gate G28 which then opens to pass to the gate G15 the binary digits received from the gate G27 during the CP2 pulse.

From the gate G15 the operation is the same as for Fig. 1.

It is contemplated that translating equipment in accordance with the invention may be employed in conjunction with a number of register-senders which would be connected to it in turn as by means of gating circuits opened at appropriate times by pulses derived from a scanning pulse generator constituted for example by some form of cyclic counter having a number of stable positions corresponding to the number of register-senders. Since the register-senders are connected one at a time, they could use the same input leads to and output leads from the translator; this has been indicated in Figs. 1 and 2 by the square brackets applied to the leads L1 to L10. The AP pulse may be used to step the scanning pulse generator from one position to the next, doing so on alternate revolutions of the storage drum if the selected main track address contains no instruction to look in an auxiliary track. If, however, an instruction to look in an auxiliary track is read from a main track a subsequent revolution of the drum is require for reading the information on such auxiliary track and in order to prevent the connection of another register-sender to the translator until this has been done a signal is applied over the lead Z from the gate G10 to inhibit the stepping of the scanning generator during such time as a T3 trigger circuit is in its operated condition.

Only certain digits in each translation may pertain to the setting up of a route to a called exchange, and of these digits only some, which will be termed the basic routing digits hereinafter, may be pertinent to the actual setting up of the outgoing route from the calling exchange; for instance only the last five digits of any translation may be routing digits and of these five only the first two may be used in setting the selectors at the calling exchange, being sufficient to deal with up to a hundred outgoing routes. In order to save a register-sender having to set up a route which may subsequently be found to be busy, it would be convenient to examine the state of the routes from the translator.

To this end the group of binary digits constituting each of the basic routing digits may be separately abstracted from a translation read from a selected main or auxiliary track address and employed to select for examination the "route busy" wire for the route to which that translation pertains. The presence of a busy marking on the wire thus selected may then cause the register-sender to ask for another choice of translation or may itself cause the translator to provide such other choice and signal to the register-sender the fact that it has done so, the register-sender being arranged to continue asking for this latter choice until all the digits of the translation have been read off on subsequent translation revolutions of the storage drum.

To provide this latter facility the translating equipment of Fig. 1 or Fig. 2 may be provided with the additional equipment which will now be described with reference to Fig. 8.

Where this additional apparatus is provided, a register-sender requiring translation for a code initially does not specify any particular choice of translation, that is the leads L8 and L9 are left unmarked, but simply indicates that the first digit of the translation is required. This it does by appropriately marking two of the leads L7 (Fig. 1 or 2) to open one of the GG gates and operate the corresponding RG relay, the gate thus opened being designated GG1 in Fig. 8.

The auxiliary or main track address sector at which the required translation is stored is selected as before in accordance with the values of the code digits as received by the translator over the leads L1—L6 (Fig. 1) or L1—L5 (Fig. 2). If an auxiliary track address is selected, the binary digits read therefrom and passed to the gate G15 are also passed to a gate G30 (Fig. 8) which when the register-sender is asking for a first translation is stimulated by the output from the gate GG1 and accordingly passes the digits it receives to two further gates G31 and G32. Assuming that there are two basic routing digits in each translation and that their positions correspond to the WP4 and WP5 pulses respectively (that is, the basic routing digits are the first two of the last five translation digits), the WP4 and WP5 pulse trains are respectively applied to the gates G31 and G32. The five binary digits constituting the first routing digit are therefore passed by the gate G31 to a group of five gates to which are also respectively applied the BP1—BP5 pulse trains; two of these latter gates, which control respective trigger circuits similar to the G16 gates in Figs. 1 and 2, are shown as GX1 and GX4 in Fig. 8 together with their associated trigger circuits TX1 and TX4. Since two of the five binary digits applied to the GX gates are marked two of these gates, such as GX1 and GX4, will open and the corresponding pair of TX trigger circuits will be operated. The value of the first routing digit is thus "staticised" in two-out-of-five code on the outputs of the TX trigger circuits and this is converted to a one-out-of-ten coding by means of gating circuits, typified by GM(10), which function similarly to the GA—GC gates of Fig. 1 and cause selective operation of one of ten relays typified by RM(10). In other words, one of the RM relays will be energised depending on the value of the first routing digit of the translation at the selected auxiliary track address. Likewise the binary digits constituting the second basic routing digit of such translation are passed by the gate G32 to a group of GX′ gates which also receive the BP1—BP5 pulse trains and control the operation of a group of TX′ trigger circuits in the same way as the GX gates control the TX triggers, with the result that in accordance with the value of this second basic routing one of ten gates typified by GN(10) will be opened to energise one of ten relays typified by RN(10). The energized RM and RN relays then select by their contacts such as RNC and RMC the "route busy" wire for the route to which they relate, there being up to a hundred such wires from which the RNC contacts can select a group of ten while the RMC contacts select the appropriate wire from the selected group.

The binary digits read from the main track address selected in accordance with the code received for translation and passed to the gate G3 are also passed to a gate G33 stimulated from the gate GG1. When the register-sender is asking for a first translation digit the gate G33 thus passes these binary digits to two gates G34 and G35 one of which (G34) is opened by the CP1 pulse to pass the binary digits constituting the first choice translation at the selected main track address, while the other, G35, is opened by the CP2 pulse to pass the binary digits constituting the second choice translation.

From the binary digits passed by the gate G34 the gates G36 and G37, opened by the WP4 and WP5 pulses respectively, select those constituting the first and second basic routing digits of the first choice translation, the values of these two basic routing digits then being staticised in two-out-of-five code on respective groups of TY and TY′ trigger circuits through groups of GY and GY′ gates, the action being similar to that already described for the GX gates and TX trigger circuits. Two groups of ten gates typified by GO(10) and GP(10) then convert this two-out-of-five coding to one-out-of-ten, resulting in one of ten RO relays and one of ten RP relays being energised in accordance with the values of the basic routing digits in the first choice translation, the RO and RP relays thus energised selecting by their contacts such as ROC and RPC the "route busy" wire for the route to which these latter basic routing digits pertain.

In a similar way the gates G38 and G39 select from the binary digits passed by the gate G35 those constituting the first and second basic routing digits of the second choice translation at the selected main track address, a group of GZ gates and TZ trigger circuits again causing selective opening of one of ten GQ gates to energise one of ten RQ relays in accordance with the first of these basic routing digits, and a group of GZ′ gates and TZ′ trigger circuits likewise causing selective opening of one of ten GS gates to energise one of ten RS relays in dependence on the value of the second basic routing digit of the second choice translation. The energised RQ and RS relays then selected by their contacts such as RQC and RSC the "route busy" wire for the route to which the relevant routing digits pertain.

The RM—RS relays are set during a translation revolution at the beginning of which the output from the gate G20, opened as described in connection with Fig. 1, has reset any of the trigger circuits TX, TX′, TY, TY′, TZ, TZ′ that have previously been operated and also a trigger circuit T7. Considering first the case when an auxiliary track address is found containing a translation for a received code, on the next translation revolution (AP pulse applied but gate G20 not opened) the binary digits passed by the gate G30 operate the trigger circuit T7 to stimulate a gate G40. If the route to which the translation relates is free, the "route busy" wire selected by the energised RM and RN relays will be unmarked and no signal will be sent to the register-sender over the "choice busy" leads L11 and L12. With the register-sender still requesting a first translation digit (gate GG1 open) a gate G41, and in consequence a gate G42 inserted in the lead L8, will then open to mark that lead, with the result that the first digit of the translation at the selected auxiliary track address, as staticised on the T4 trigger circuits (Fig. 1 or 2), will accordingly be sent back to the register-sender as previously described. If, however, the route concerned is busy, the marking then existing on the selected "route busy" wire results in the gate G40 opening to mark the "1st choice busy" lead L11 through a gate G43 and thereby give an indication of the busy condition to the register-sender. The gate G41 and therefore the gate G42 do not then open.

As previously described, a "second choice" to an auxiliary track translation is provided by the first choice translation at the corresponding main track address. If the route to which this latter translation relates is free, the "route busy" wire selected by the energised RO and RP relays will be unmarked and the lead L12 therefore remains unmarked. A gate G44, and in consequence a gate G45 inserted in the lead L9, will therefore open to mark that lead and cause the first digit of the first choice translation at the selected main track to be sent back to the register-sender. If, however, this alternative route is also busy, the marking on the appropriate "route busy" wire, in conjunction with the output from the open gate G40, opens a gate G46 to mark the "2nd choice busy" lead L12 and indicate the fact to the register-sender. The gate G43 then remains closed and with the leads L8 and L9 unmarked no translation digit is sent back to the register-sender.

Where no auxiliary track address is found containing a translation for a received code the trigger circuit T7 remains in its reset position and stimulates a gate G47. If the route pertaining to the first choice translation at the selected main track address is free neither of the leads L11 or L12 is marked and the gates G41 and G42 open to mark the lead L8, thus causing this first choice translation to be sent back. Should the route concerned be busy, however, the marking on the "route busy" wire selected by the RO and RP relays results in the gate G47 being opened and a mark being applied to the "1st choice busy" lead L11 through the gate G43. If the route pertinent to the second choice translation is free the gates G44 and G45 open to mark the lead L9 as before. If, however, the latter route is also busy, as indicated by a mark on the "route busy" wire selected by the RQ and RS relays, the output from the gate G47, in conjunction with this mark, opens a gate G48 to mark the "2nd choice busy" lead L12, the gates G44 and G45 remaining closed so that the leads L9 remain unmarked and no translation digit is sent to the register-sender.

Assuming that a free route is found, in which event at least the lead L12 will not be marked, then on subsequent translation revolutions the register-sender will mark one or other of the leads L9 or L8 to request, in dependence on whether or not the lead L11 is marked, the same choice of translation as that for which it has already received the first digit, asking at the same time for the second or later translation digit as may be required. As the gate GG1 will then no longer be open, the additional apparatus of Fig. 8 is rendered ineffectual and the translator operates as previously described for Fig. 1 or 2 as the case may be.

The gating circuits, other than the GE1 and GE2 gates, the gates G7, G8, G41 and G44, and the gates G10, G17, G42, G43 and G45 may each be constituted by a circuit such as that now to be described with reference to Fig. 4*a*.

Figures 4A, 4B, 5, 6, 7:
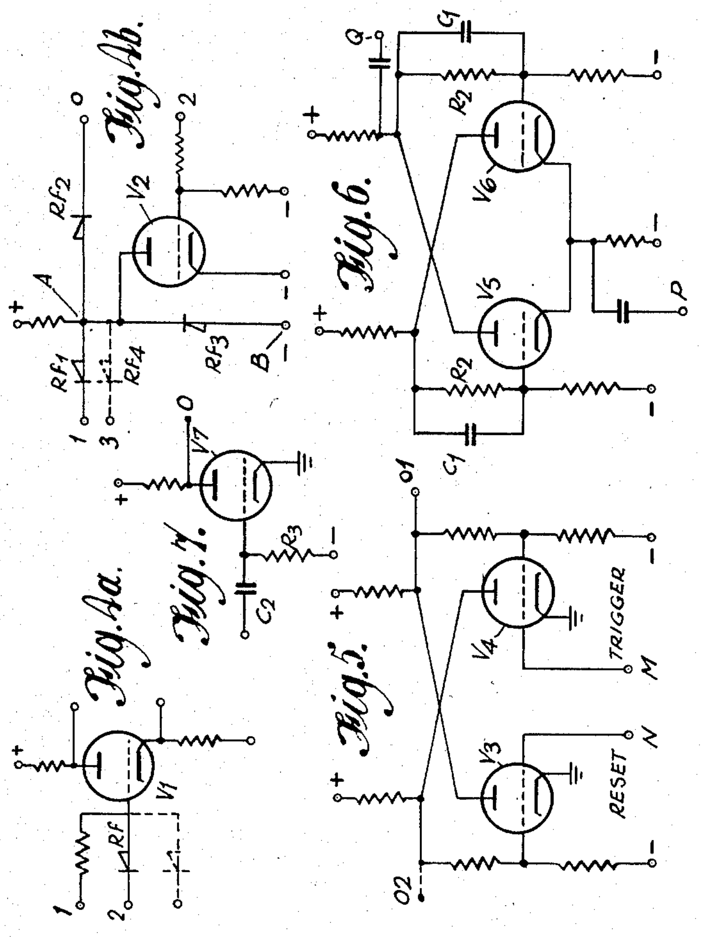

Referring to Fig. 4*a* the valve V1 is normally non-conductive and if a positive signal is applied to the terminal 1 without a signal being applied to the terminal 2 this signal will be diverted away from the grid of the valve through the rectifier R*f* so that the valve will remain non-conductive. If, however, a positive signal is applied to the terminal 2 at the same time as one is applied to the terminal 1, the rectifier R*f* will be backed off by the signal at the terminal 2 and the signal on the terminal 1 will then raise the grid potential of the valve, resulting in the valve becoming conductive. Output signals of opposite polarities will then be obtained at the anode and cathode of the valve, either of these signals being used as may be most suitable for a following circuit. These signals are obtained only when both the input terminals 1 and 2 receive a positive signal together. In the case of a gate such as G4, which has to open only on coincidence of three input signals, the grid of the valve V1 would be connected to a third input terminal through a half-wave rectifier poled similarly to the rectifier R*f*, this being indicated by the dotted lines in Fig. 4*a*.

Figure 4C:
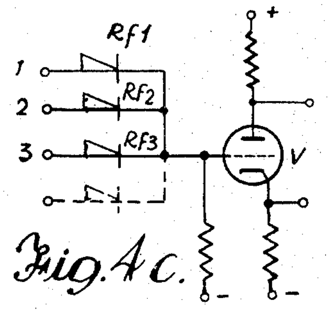

The circuit for the gates G10, G17, G42, G43 and G45 may be as shown in Fig. 4*c*, in which as many input terminals 1, 2, 3, . . . as may be required are connected through respective rectifiers R*f*11, R*f*12, R*f*13 . . . to the grid of a normally non-conducting valve V. The aplication of a positive signal at any one input terminal results in the valve V being rendered conductive, output signals of positive and negative polarity respectively being then produced at the cathode and anode of the valve V.

For the gates G7, G8 and G41 the circuit of Fig. 4*b* may be used. In the absence of positive signals at the terminals 1 and 2 (the terminal 1 normally being negative) the point A is clamped to the potential of the terminal 1 due to current flow from the positive terminal through resistor R1 and rectifier R*f*1 to the terminal 1. With a positive signal applied to the terminal 1 but no signal applied to terminal 2 the point A is allowed to rise to the potential of the signal at terminal 1 so that the rectifier R*f*2 conducts and an output signal appears at the terminal 0. If, however, a signal is applied to terminal 2 the normally non-conducting valve V2 is caused to conduct so that its anode potential falls. When, as a result, the anode potential reaches the potential of the negative terminal B the rectifier R*f*3 conducts causing the anode of the valve and thus the point A to be clamped to this latter potential. The point A cannot then rise until the valve V2 ceases to conduct on removal of the signal from the terminal 2, regardless of the potential at terminal 1.

The GE1, GE2 and G44 gates may be similar to the gates G7 and G8 but with the addition, as shown dotted in Fig. 4*b*, of a third input terminal 3 connected to the point A through a rectifier R*f*4 poled similarly to the rectifier R*f*1. Positive signals would then require to be present on both the terminals 1 and 3 before the point A could rise to produce an output signal, the application of a posiitve potential to the terminal 2 having the effect of preventing this rise by rendering the valve V2 conductive as before.

The trigger circuits employed in Figs. 1 and 2 may each comprise, as shown in Fig. 5, a pair of valves V3, V4 each having its anode cross-connected to the grid of the other. With the valve V4 cut off its anode is at the positive H.T. potential and biases the valve V3 to the conducting condition. Application of a positive potential to the terminal M causes the valve V4 to conduct so that its anode potential is reduced and the grid of the valve V3 likewise falls to cut off the latter valve and produce a corresponding positive-going output signal at the terminal 0 connected to its anode. The grid of the valve V4 is then positively biased from the anode of the valve V3 so that the valve V4 remains conducting even after the triggering potential has been removed from the terminal M. The circuit is reset by the application of a positive potential to the terminal N, when a similar operation will be produced in reverse.

A circuit such as that shown in Fig. 6 may be employed for the binary counter CR2 in Figs. 1 and 2. This circuit comprises two cathode-coupled valves V5 and V6 each having its anode cross-connected to the grid of the other valve through a resistor R2 in parallel with a capacitor C1. With either of the valves conducting and the other non-conducting, application of a positive pulse to their cathodes from the input terminal P will cut off the conducting valve and by virtue of the cross-connection between the anodes and the grids will render the other valve conducting. Consequently the application of successive positive pulses to the terminal P will cause the valves to conduct alternately and an output signal will appear at the terminal Q each time the circuit changes to the condition in which the valve V5 is non-conducting and the valve V6 is conducting.

The counters CR1 may simply comprise a number of binary counting stages each constituted by a circuit similar to that of Fig. 6, the terminal Q of each stage (except the last) being connected to the cathodes of the valves in the next stage. The result is a conventional binary counter from which a positive output signal can be obtained, on any particular count, by connecting an output terminal to the anode of a valve in the counter which is initially conducting and is arranged, by appropriately initially setting the counter, to be rendered non-conductive for the first time on that count. The circuit can be initially set by the application of a positive signal to the grid of whichever valve in each stage is required to be initially conducting.

The timing elements B1 to B3 and E1 in Figs. 1 and 2 may be simply constituted by a valve V7 (see Fig. 7) to the grid of which input pulses are applied through a differentiating circuit comprising series capacitance C2 and shunt resistance R3. With the time constant of C2, R2 small compared with the pulse length, an input pulse of positive polarity will be differentiated to give on the grid of the valve V7 a short positive-going pulse at the beginning of the input pulse and a short negative-going pulse at the end. Accordingly with the valve normally non-conductive the application of a positive input pulse would result in the valve being rendered conductive for a short interval at the beginning of the pulse, thereby giving a corresponding output signal at the anode at this time, as required for the timing elements B1 to B3. For the timing element E3 a positive input pulse is reversed in polarity before application to the differentiating circuit, so that the short positive-going pulse which makes the valve conduct occurs at the end, rather than the beginning, of the input pulse.

The coincidence gates and associated relays which are used in Figs. 1 and 2 to convert a received two-out-of-five marking into a one-out-of-ten indication and to select accordingly either one out of a group of ten reading heads (as in the case of the GB gates and RB relays) or one group out of ten such groups of heads (as in the case of the GA gates and RA relays), may be replaced, in a modification of the embodiments of Figs. 1 and 2, by a system such as that of Fig. 9 employing multiple-winding saturable transformers. Referring to Fig. 9, a group of ten saturable transformers Tf1–Tf10 is used for selecting one out of ten reading heads (not shown) in response to and in accordance with a code digit received over a group of leads L in two-out-of-five code, this corresponding to the function of the GB gates and RB relays in Figs. 1 and 2, and also to the function of the GA gates and RA relays since the latter served to select one head from those selected from the respective groups of heads by the RB relays. Each of the transformers Tf1–Tf10 has a core represented by the correspondingly numbered circle, an input winding WI, two control windings W1 and W2, a bias winding WB, and an output winding WO, the output windings of the several transformers being connected in a series "chain" between earth and an Output lead, so labelled. The control windings W1 and W2 of each transformer are arranged in respective series connections between earth and two of the five leads L, the particular pair of leads L with which the control windings W1 and W2 of any transformer are associated in this way being unique to that transformer, as can be seen upon examination of the connections in Fig. 9. For serving the function of the GB gates and RB relays the input windings WI of the transformers Tf1–Tf10 are connected to receive the outputs from the respective reading heads of the group from which one head is to be selected. The bias windings WB of the transformers Tf1–Tf10 are connected in a series "chain" between earth and a source of bias potential the magnitude of which is chosen so that, in the quiescent state, the current flowing through the bias windings saturates the transformers and thereby renders ineffective the small currents received by the input windings from the respective reading heads connected to them. When two of the leads L are marked to indicate the value of a received digit, one of the transformers, and only one, has current flowing in both its control windings W1 and W2, these currents being in such sense and of such magnitude as together to completely oppose the effect of the current in the bias winding of that transformer. The core of that particular transformer is therefore brought out of saturation and current flowing in its input winding WI from the reading head connected thereto can then induce current in the output winding WO of the transformer to produce a corresponding signal on the Output lead. The circuit conditions are chosen to require that both control windings W1 and W2 of any transformer must carry current from the leads L before its core is brought out of saturation: therefore although several other transformers have current flowing in one of their control windings W1 or W2 when leads L are marked in two-out-of-five code, the cores of these other transformers remain sufficiently saturated to prevent input current in their WI windings from being effective to produce any output. Consequently the signal obtained at the Output lead will be a reproduction of the binary digits read from the magnetic drum by the reading head selected in dependence on the code digit received over the leads L.

To serve the function of the RB relays in Figs. 1 and 2, one transformer group conforming to Fig. 9 would be provided for each group of ten MH heads (requiring ten such transformer groups in all) and the input winding WI of the ten transformers in each group would be connected respectively to the ten reading heads associated with that group. Leads corresponding to the B digit leads L2 in Fig. 1 would then constitute the leads L in Fig. 9 for the several transformer groups. Preferably one and the same set of B digit leads would be used for the several transformer groups by connecting between each such lead and earth a series circuit including all those control windings (W1 and W2) which have to be energised in the several groups when that particular lead is marked.

There would thus be obtained from the ten transformer groups respective output signals each being a reproduction of the binary digits read by the particular head selected from the relevant group of heads. In order to select, in conformity with the function of the RA relays in Figs. 1 and 2, the output from one of the ten reading heads thus selected according to the B digit, the outputs from the ten transformer groups serving the function of the RB relays may then be respectively applied to the input winding WI of a further, similar transformer group in which the leads L are constituted by the leads L1 of Figs. 1 and 2 so that the output signal obtained from this last transformer group will be a reproduction of the binary digits read only by the one reading head selected according to the A digit. As an alternative, instead of the outputs from the ten transformer groups being applied to a further, similar group for selection, the output windings WO of all the transformers in said ten groups could be connected in one series chain between earth and a single output terminal and the bias windings WB then used to select from which group the output is taken, this being done by arranging that when the output from a particular group is required (as determined by the received A digit) the bias currents in the other groups is increased to such a value as to maintain saturation in all the transformers therein in spite of one transformer in each such other group having both its control windings W1 and W2 energised at this time.

Similar saturable transformer arrangements on the lines of that of Fig. 9 but requiring only one control winding per transformer could be employed for instance, in substitution for the RH relays in Figs. 1 and 2 to select one of the ten AH auxiliary track reading heads. Saturable transformer groups may also be similarly employed instead of the various selectively operated relays (for instance the RD relays) governing the selective application of different pulse trains and especially of the BP pulse trains.

Whereas the detail circuits described with reference to Figs. 4–7 employ thermionic valves, it is to be understood that similar circuits may alternatively be used employing transistors instead, any necessary circuit modifications being well known to those skilled in the transistor art.

What I claim is:

1. Translating equipment for providing translations for digital codes, comprising in combination: a continuously operable information storage device having main and auxiliary storage tracks defined thereon for the serial storage at main track addresses of translations pertaining to codes requiring translation for only a given number of code digits and for the storage at auxiliary track addresses of translations pertaining to a greater number of code digits, each auxiliary track address having also stored therein a group of stored digits representing certain digits, including those additional to said number, of the code for which the address includes a translation; reading heads associated respectively with said tracks; means for receiving a code requiring translation; means responsive to said given number of the digits of a received code for selecting on a main track of the storage device an address at which translation information relative to the digits in said number is stored, said information including a distinctive characteristic if the digits in said number are such as may belong to a code requiring translation for a greater number of digits; means responsive to translation information read from said address with such distinctive characteristic for selecting an auxiliary track on which a translation corresponding to such greater number of digits may be found, means for comparing the stored code digits on such auxiliary track as thus selected with the relevant digits of the code actually received; means responsive to identity being found between the compared digits at any address on saild auxiliary track for passing on a translation read from that address; and means effective when no such identity is found, and likewise when the information at the selected address on the main track has not a distinctive character as aforesaid, for passing on a translation read from this last-mentioned address.

2. Translating equipment as claimed in claim 1 adapted to function with the translation information at a main track address provided with said distinctive characteristic in the form, when present, of a particular value given to a particular digit stored at the address, said value indicating on which one of a plurality of auxiliary tracks a pertinent translation may be found, which equipment includes, for auxiliary track selection, means responsive to the value of such particular digit as read from a selected main track address to select the auxiliary track indicated by said value.

3. Translating equipment as claimed in claim 1 adapted to function with the translation information at a main track address provided with said distinctive characteristic in the form, when present, of a particular value given to a particular digit stored at the address, said value indicating on which one of a plurality of auxiliary tracks a pertinent translation may be found, which equipment includes means for abstracting from translation information as read from a selected main track address that portion thereof corresponding to said particular digit, together with a plurality of two-state trigger circuits selectively responsive to said abstracted information to assume different combinations of their states according to the value of said digit, and means governed according to the combined states of said trigger circuits for selecting from a plurality of reading heads associated respectively with the auxiliary tracks the one associated with the track indicated by said value.

4. Translating equipment as claimed in claim 1 adapted to function with the stored groups of code digits at the auxiliary track addresses stored in binary digit form so that the group stored at any auxiliary track address will be represented, as read therefrom, by a train of a predetermined number of pulses occurring at relative times determined by the code digit values in the group, the equipment including means for providing, in response to those digits of a received code that are to be compared with the stored code digits, a recurring train of pulses having the same number and timing of pulses as would be obtained from the received code digits if stored on the storage device, means for comparing said recurrent train with pulse trains representing groups of code digits as read from successive addresses on a selected auxiliary track, and means responsive to identity being found at any address between the compared pulse trains for passing on the translation at that address.

5. Translating equipment as claimed in claim 4, wherein the comparison means comprises a coincidence gate connected to receive as one input thereto said recurrent pulse train representing the received code digits to be compared, and as another input thereto the trains of pulses representing the stored code digits as read from successive addresses on the selected auxiliary track, the equipment also including a counter responsive to the output of said gate for counting the number of input pulse coincidences occurring in successive periods each equal to that of one pulse train, which counter is effective, if and when the count reaches said predetermined number of pulses in a train and thereby indicates identity between the recurrent pulse train and one received by the gate from an auxiliary track address, to cause the translation read from that address to be passed on.

6. Translating equipment as claimed in claim 1 including, for the selection of a main track address, selection means responsive to a first part of a received code for selecting, from the reading heads associated with the main storage tracks, the reading head which is associated with the main track including the address concerned, together with gating means governed by a second part of the code for selecting from the output of the selected reading head that portion thereof corresponding to the translation information stored at said address.

7. Translating equipment as claimed in claim 1 including, for the selection of a main track address, selection means responsive to the value of one digit of a received code for selecting, from the reading heads associated with the main storage tracks on the storage device, a group of such heads including the head associated with the track containing the address concerned, further selection means responsive to the value of another digit of the code for selecting the last-mentioned head from the group including it, and gating means governed by the value of yet another digit of the code for selecting from the output of the selected reading head that portion thereof corresponding to the translation information stored at said address.

8. Translating equipment as claimed in claim 1, including, for selecting a particular reading head from a group thereof, a selecting circuit comprising a plurality of saturable transformers, one for each head in said group, each including input winding means for receiving the output from the appertaining head, bias winding means for maintaining the transformer saturated in quiescent state, and output winding means connected in common with the output winding means of the other transformers between output terminals for the circuit, said transformers also including respective control winding means connected to be selectively energised, in accordance with the reading head to be selected, to de-saturate only the particular transformer associated with that head, whereby said transformer is rendered responsive to output from its associated reading head to provide a corresponding output at said terminals.

9. Translating equipment as claimed in claim 1 adapted to function with said distinctive characteristic provided, when present, in the form of a stored indication of the number of code digits stored at the relevant auxiliary track address, the equipment also including means for governing the operation of the comparison means according to such indication.

10. Translating equipment as claimed in claim 1 adapted for use with at least two translations stored for a particular code at the relevant main track address and including gating means governed according to an indicated choice of translation for such code as received to select from the translation information as read from said address that portion thereof pertaining to the required translation.

11. Translating equipment as claimed in claim 1 including gating means functioning, in accordance with a particular translation digit indicated as being required, to select from the translation information as read from a selected address, that portion thereof relating to such digit.

12. Translating equipment as claimed in claim 1 including means for temporarily storing translation information read from a selected main track address, means for temporarily storing translation information read from a selected auxiliary track address, and means responsive to the presence of such temporarily stored auxiliary track information to pass on such information and inhibit the passing on of temporarily stored main track information, this last-mentioned information otherwise being passed on.

13. Translating equipment as claimed in claim 12 employing information storage means comprising a plurality of two-state trigger circuits operable to a distinctive combination of their states according to the information to be stored thereby.

14. Translating equipment as claimed in claim 1 adapted for use in an automatic telephone or like switching system in which only some digits of each translation are basic to determining an out-going route, which equipment includes means responsive to the values of the basic routing digits of a translation obtained from the storage device for testing a "route busy" lead for the route concerned without the route having to be first set up.

References Cited in the file of this patent

UNITED STATES PATENTS

| | | |
|---|---|---|
| 2,683,772 | Flowers | July 13, 1954 |
| 2,738,382 | Brooks et al. | Mar. 13, 1956 |
| 2,740,003 | Newby | Mar. 27, 1956 |
| 2,764,634 | Brooks et al. | Sept. 25, 1956 |